(12) United States Patent
Saito

(10) Patent No.: US 9,013,618 B2
(45) Date of Patent: Apr. 21, 2015

(54) IMAGE PICKUP APPARATUS AND ITS CONTROL METHOD

(71) Applicant: Canon Kabushiki Kaisha, Tokyo (JP)

(72) Inventor: Kyota Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/334,032

(22) Filed: Jul. 17, 2014

(65) Prior Publication Data
US 2014/0327794 A1 Nov. 6, 2014

Related U.S. Application Data

(63) Continuation of application No. 13/044,113, filed on Mar. 9, 2011, now Pat. No. 8,817,158.

(30) Foreign Application Priority Data

Mar. 15, 2010 (JP) .................. 2010-057903

(51) Int. Cl.
H04N 5/222 (2006.01)
H04N 5/232 (2006.01)
G06F 3/0488 (2013.01)
H04N 1/00 (2006.01)

(52) U.S. Cl.
CPC .......... H04N 5/23216 (2013.01); G06F 3/0488 (2013.01); H04N 1/0035 (2013.01); H04N 5/23293 (2013.01)

(58) Field of Classification Search
CPC .................................... H04N 5/23293
USPC ................ 348/222.1, 333.02, 333.03, 333.12
See application file for complete search history.

(56) References Cited

U.S. PATENT DOCUMENTS

| | | | |
|---|---|---|---|
| 5,923,908 A * | 7/1999 | Schrock et al. .................. | 396/85 |
| 7,034,881 B1 * | 4/2006 | Hyodo et al. ............ | 348/333.12 |
| 2003/0016883 A1 * | 1/2003 | Baron ........................... | 382/289 |
| 2010/0177218 A1 * | 7/2010 | Ohuchi ..................... | 348/240.99 |
| 2010/0316366 A1 * | 12/2010 | Kawashima .................. | 396/213 |

* cited by examiner

Primary Examiner — Gevell Selby
(74) Attorney, Agent, or Firm — Cowan, Liebowitz & Latman, P.C.

(57) ABSTRACT

An image pickup apparatus controls in such a manner that if a touch applied to a touch operation member is detected by a detection unit arranged to detect a touch operation applied to the touch operation member, a photographic preparation unit makes an adjustment of a photographic setting, and after the touch, if the detection unit detects a predetermined touch operation and thereafter detects that the touch operation member loses the touch applied thereto, a photographic processing unit does not execute a photographic processing, while after the touch, if the detection unit detects that the touch operation member loses the touch applied thereto without detecting the predetermined touch operation, the photographic processing unit executes the photographic processing.

16 Claims, 10 Drawing Sheets

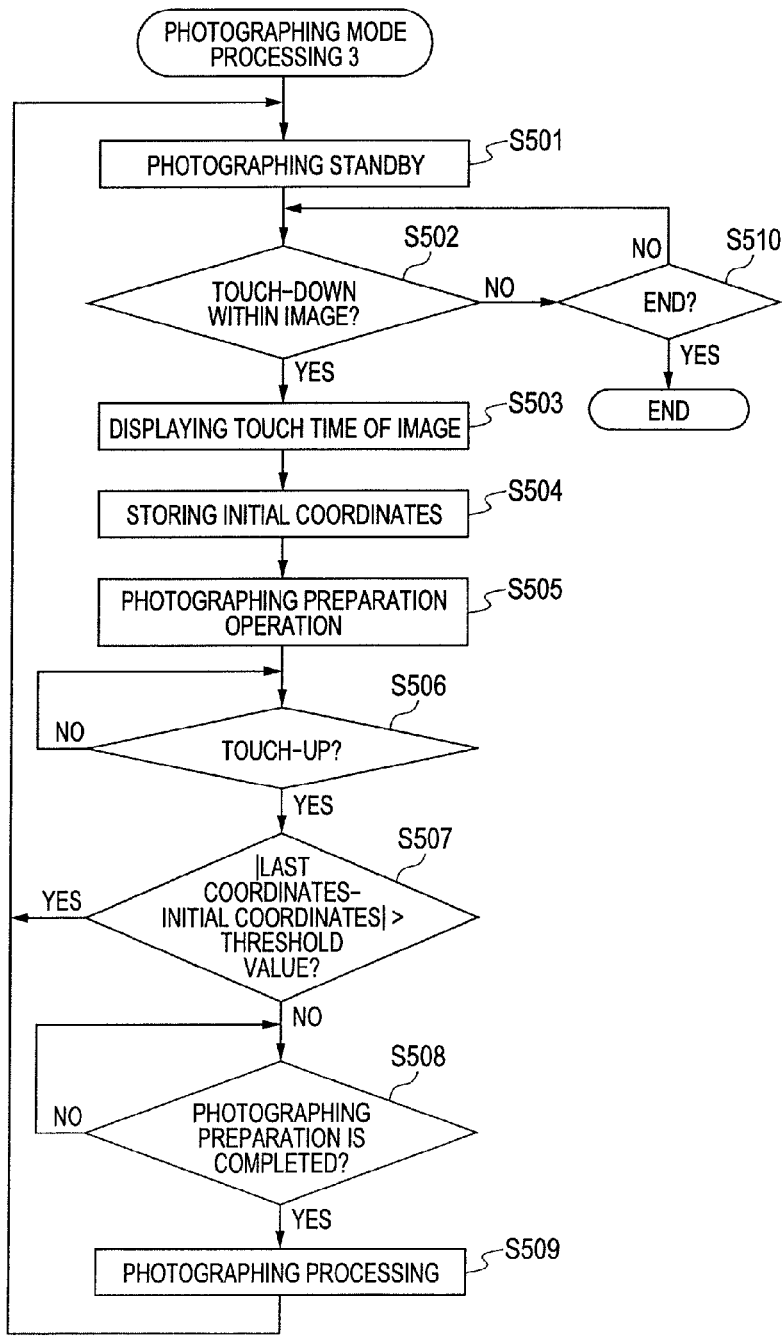

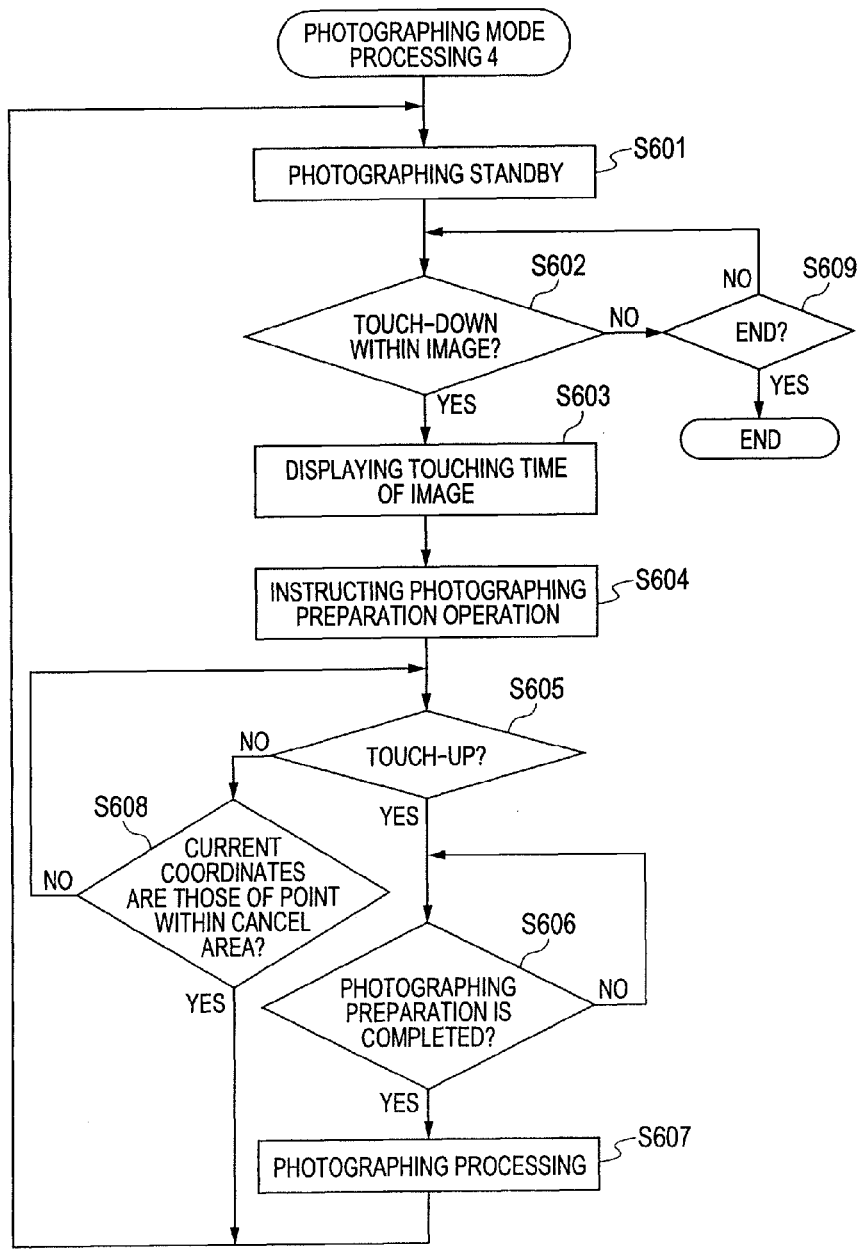

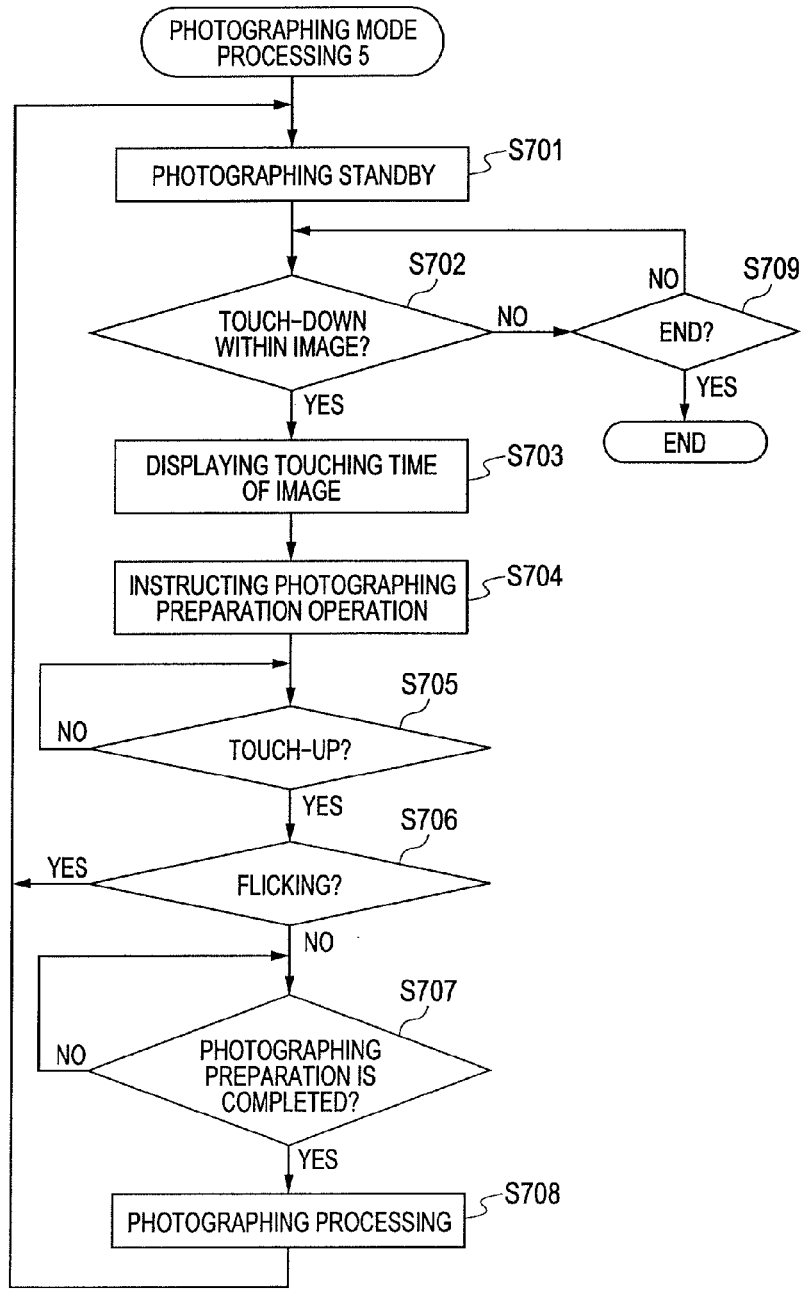

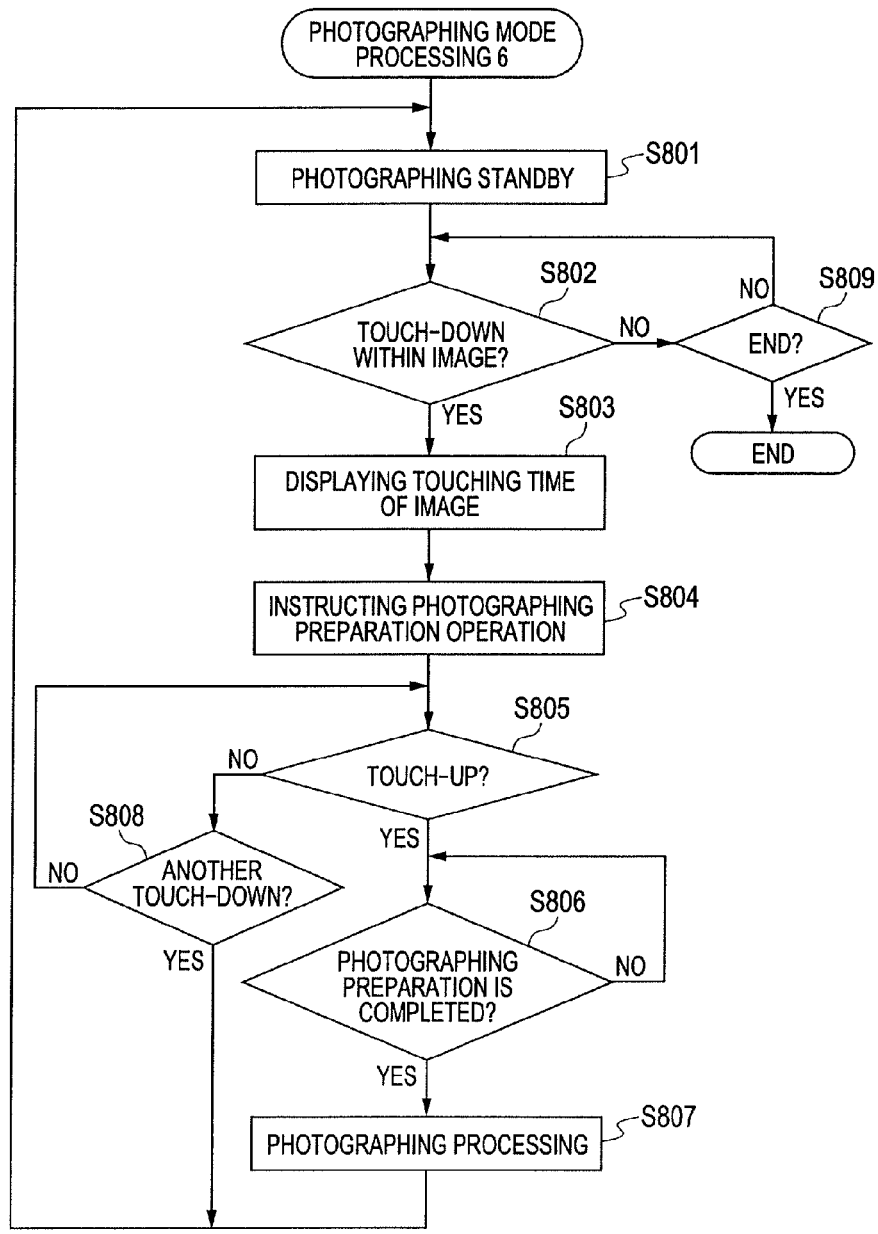

IMAGE PICKUP APPARATUS AND ITS CONTROL METHOD

CROSS-REFERENCE TO RELATED APPLICATIONS

This application is a continuation of application Ser. No. 13/044,113, filed Mar. 9, 2011, the entire disclosure of which is hereby incorporated by reference.

BACKGROUND OF THE INVENTION

1. Field of the Invention

The present invention relates to an image pickup apparatus and, more particularly, to an image pickup apparatus having a touch sensor for detecting touch coordinates.

2. Description of the Related Art

Hitherto, a release switch of a push-button type is generally provided for an image pickup apparatus called a camera, and the release switch has a non-depression state (which is generally a non-manipulated state in which the switch is not depressed), a full depression state in which a push-button causes the release switch to be depressed up to a maximum depression at which point the release switch is fully switched, and a half depression state as an intermediate state between them. In the half depression state (hereinbelow, referred to as SW1) of the release switch, photographing preparation operations such as autofocus control, autoexposure control, and auto white balance control are instructed. Further, when the release switch is set into the full depression state (hereinbelow, referred to as SW2), the actual photographing operation instruction (photographing instruction) is performed.

In a recent digital camera in which an object image is displayed on a liquid crystal panel screen so that a user can photograph the object image while confirming it on the screen, there is a case where a touch panel is used as an operation instruction unit. Among such cameras, there is a camera which is designed to use the touch panel to provide an operation instruction so that the camera operates as if a mechanical release switch is operated in a two-step manner of the half depression SW1 state and the full depression SW2 state.

As such a kind of camera, there is a camera in which a touch panel which can detect a pressure of finger pressing is used. This camera is arranged such that if it is detected that the panel is depressed and the pressure of the finger pressing is equal to or less than a certain threshold value, the photographing preparation operation is instructed, while if the pressure exceeds the threshold value, the photographing operation is instructed (refer to Japanese Patent Application Laid-Open No. 2007-236008).

There is also a camera in which a touch panel which can detect an area of finger pressing is used. This camera is arranged such that if the area of finger pressing is detected by using such a touch panel and the area is equal to or less than a certain threshold value, the photographing preparation operation is instructed, while if the pressure exceeds the threshold value, the photographing operation is instructed (refer to Japanese Patent Application Laid-Open No. 2007-093967).

There is also another camera which is designed to use two touch sensors such that the camera operates as if the mechanical release switch is operated in a two-step manner of the half depression SW1 state and the full depression SW2 state, thereby suppressing a camera shaking. In such a camera construction, the photographing preparation operation is instructed when the two sensors are touched, while upon detaching the finger from one of the two sensors, the photographing operation is instructed (refer to Japanese Patent Application Laid-Open No. H11-160776).

Although the methods of attaining the states SW1 and SW2 of the release switch using the touch detection unit have existed hitherto as mentioned above, a problem still remains in any of the above related arts and a countermeasure for solving such a problem is demanded.

For instance, in the example using the touch panel which is arranged to detect the pressure or the touch area of the finger pressing, it is necessary to strongly press the liquid crystal screen to attain the full depression SW2 state of the release switch, so that there is such a problem that a possibility of occurrence of the camera shaking rises.

In addition, since the touch panel which is arranged to detect the pressure or the touch area of the finger pressing is necessary, it is difficult to realize an image pickup apparatus by using a general low-cost touch panel which outputs only touch coordinates. The touch panel is thus difficult and costly to manufacture.

Further, since the example using the two touch sensors requires the two sensor devices, this may be a factor of causing an increase in costs and also results in such a problem that an operation procedure is complicated and is hard to be learned, and it is also difficult to operate with one hand.

SUMMARY OF THE INVENTION

It is desirable to provide an image pickup apparatus which can solve the foregoing problems of the related arts and realize a photographic preparation operation instruction and a photographic instruction by a touch operation which can attain high operability while avoiding that a camera is shaken due to the touch operation.

According to an aspect of the invention, an image pickup apparatus of the present invention comprises: an image pickup unit; a photographic preparation unit configured to make an adjustment of a predetermined photographic setting of a photography by the image pickup unit; a photographic processing unit configured to effect the photography by the image pickup unit on the basis of the photographic setting adjusted by the photographic preparation unit and execute a photographic processing for recording a photographed image onto a recording medium; a touch detection unit configured to detect a touch operation applied to a touch operation member; and a control unit configured to effect control in such a manner that if the touch applied to the touch operation member is detected by the touch detection unit, the photographic preparation unit makes the adjustment and, after the touch, if it is detected that the touch operation member loses the touch applied thereto, the photographic processing unit executes the photographic processing.

The photographic preparation operation instruction and the photographic instruction can thus be made by the touch operation of high operability while avoiding that the camera is shaken due to the touch operation.

Further features of the present invention will become apparent from the following description of exemplary embodiments with reference to the attached drawings.

BRIEF DESCRIPTION OF THE DRAWINGS

FIG. 5 is a flowchart of a processing procedure of a photographic mode of a third embodiment.

FIG. 6 is a flowchart of a processing procedure of a photographic mode of a fourth embodiment.

FIG. 7 is a flowchart of a processing procedure of a photographic mode of a fifth embodiment.

FIG. 8 is a flowchart of a processing procedure of a photographic mode of a sixth embodiment.

DESCRIPTION OF THE EMBODIMENTS

Exemplary embodiments of the present invention will be described in detail in accordance with the accompanying drawings.

Figure 1:
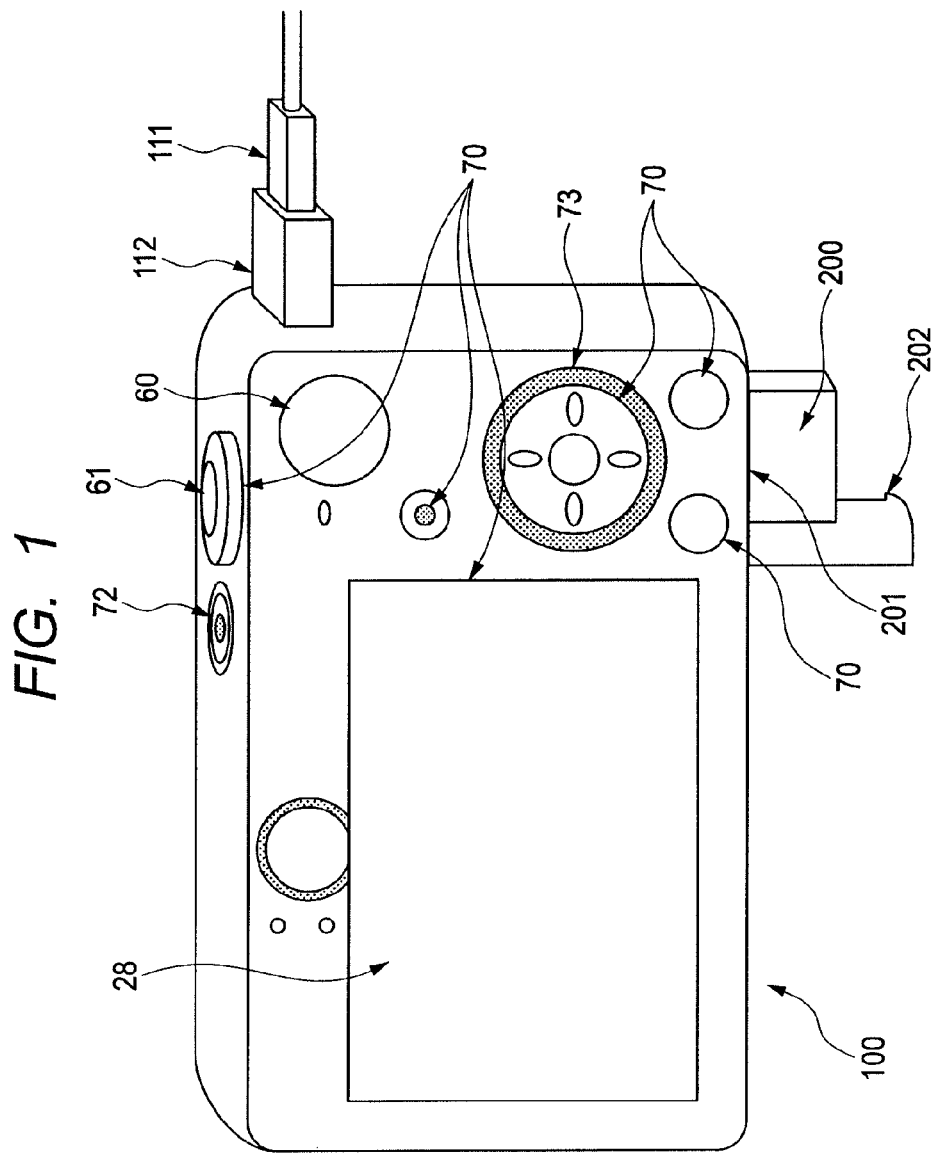
FIG. 1 is a diagram illustrating an external appearance of a digital camera as an example of an image pickup apparatus according to the invention.

FIG. 1 illustrates an external appearance of a digital camera 100 as an example of an image pickup apparatus of the present invention. A display unit 28 displays an image and various kinds of information. The display unit 28 is constructed with a touch panel and can detect a touch applied to the display unit 28. A shutter button 61 is an operation unit for making a photographic instruction. A mode dial 60 is an operation unit for switching various kinds of modes. A connection cable and the digital camera 100 are connected through a connector 112. An operation unit 70 is constructed with operation members such as various kinds of switches, buttons, touch panel, and the like adapted to be operated by a user in various kinds of manners. A controller wheel 73 is a rotatable operation member included in the operation unit 70. A power switch 72 is used to switch a power source on and off. A recording medium 200 is constructed with a memory card, a hard disk, or the like. The recording medium 200 is held in a recording medium slot 201. The recording medium 200 held in the slot 201 can communicate with the digital camera 100. A cover 202 is provided for the recording medium slot 201.

Figure 2:
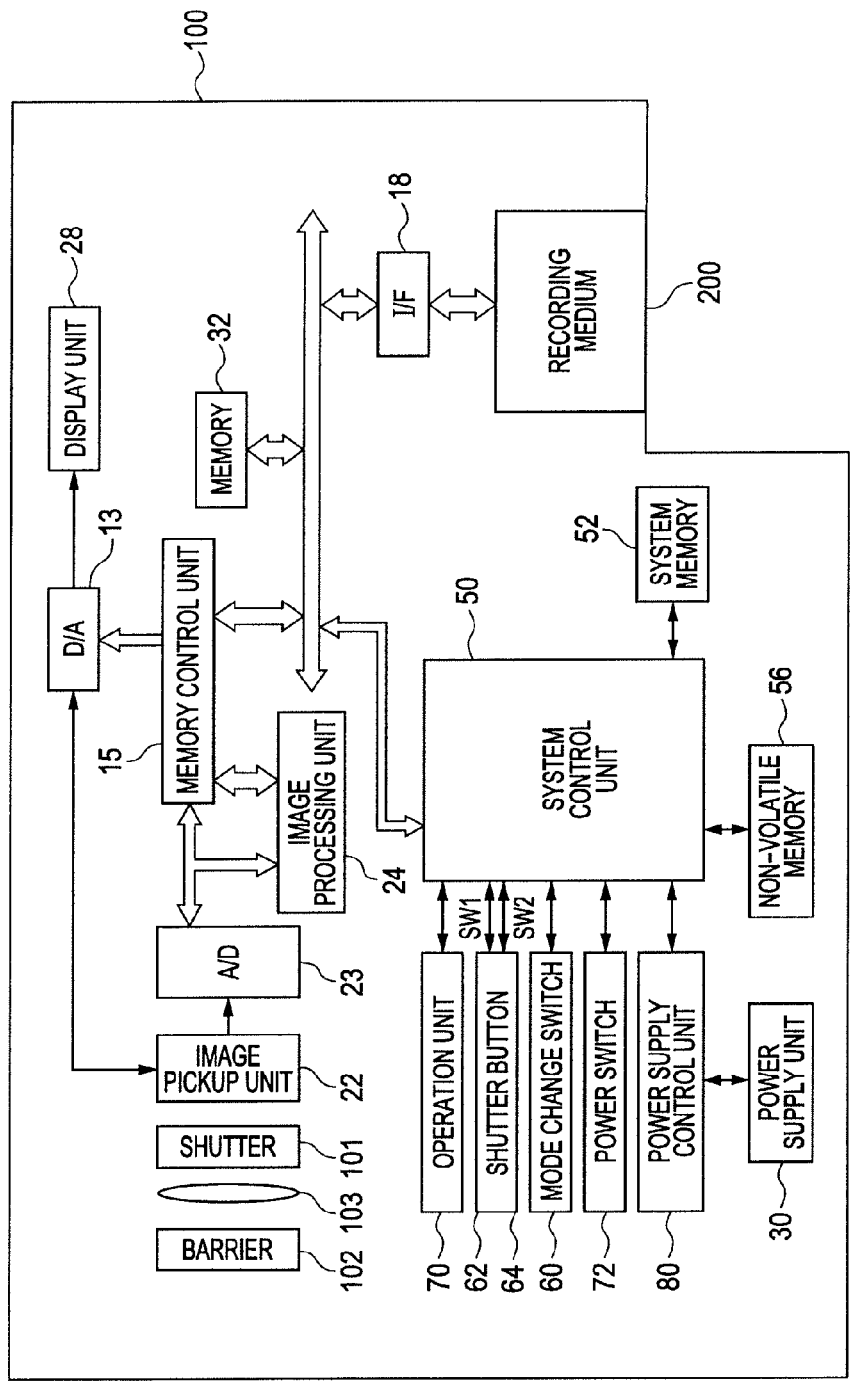
FIG. 2 is a block diagram illustrating constructional example of a digital camera 100 as an embodiment of the invention.

FIG. 2 is a block diagram illustrating a constructional example of the digital camera 100 according to the embodiments. In FIG. 2, a photographing lens 103 includes a focus lens. A shutter 101 has an iris function. An image pickup unit 22 is constructed with a charge coupled device (CCD), a complementary metal-oxide semiconductor (CMOS) element, or the like for converting an optical image into an electric signal. An analogue to digital (A/D) converter 23 converts an analog signal which is output from the image pickup unit 22 into a digital signal. An image pickup portion including the photographing lens 103 in the digital camera 100 is covered with a barrier 102, thereby preventing an image pickup system including the photographing lens 103, shutter 101, and image pickup unit 22 from being soiled or damaged.

An image processing unit 24 executes a resizing processing such as predetermined pixel interpolation or reduction and a color conversion onto data which is output from the A/D converter 23 or data which is output from a memory control unit 15. The image processing unit 24 also executes a predetermined arithmetic operation processing by using picked-up image data. A system control unit 50 performs exposure control and distance measurement control on the basis of the result of executed arithmetic processing. Thus, an AF (autofocus) processing, an AE (autoexposure) processing, and an EF (flash light pre-emitting) processing of a TTL (through-the-lens) type are executed. The image processing unit 24 further executes a predetermined arithmetic operation processing by using the picked-up image data and executes an AWB (auto white balance) processing of the TTL type on the basis of the obtained arithmetic operation result.

The output data from the A/D converter 23 is written into a memory 32 through the image processing unit 24 and the memory control unit 15 or is directly written into the memory 32 through the memory control unit 15. The memory 32 stores the image data which is obtained by the image pickup unit 22 and converted into the digital data by the A/D converter 23 and/or into the image data to be displayed to the display unit 28. The memory 32 has a storage capacity large enough to store a predetermined number of still images and motion images and sound of a predetermined duration. If the picked-up image data is sequentially displayed by using the display unit 28, an electronic viewfinder function (through-image display) can be realized.

The memory 32 also functions as a memory (video memory) for displaying images. A digital to analogue (D/A) converter 13 converts the image display data stored in the memory 32 into an analog signal and supplies to the display unit 28. The image display data written in the memory 32 is displayed by the display unit 28 through the D/A converter 13. The display unit 28 displays an image corresponding to the analog signal from the D/A converter 13 on a display such as an LCD.

A non-volatile memory 56 is an electrically erasable and recordable memory and, for example, an EEPROM (electrically erasable programmable read-only memory) or the like is used. Operation constants of the system control unit 50, a program, and the like are stored in the non-volatile memory 56. The program mentioned here is a program for executing various processes of the embodiments of the present invention, which will be described hereinafter with reference to flowcharts in the figures.

The system control unit 50 controls the whole digital camera 100. Respective processes in the embodiment, which will be described hereinafter, are realized by executing the foregoing program recorded in the non-volatile memory 56. A random access memory (RAM) is used as a system memory 52. The constants and variables for operation of the system control unit 50, the program read out of the non-volatile memory 56, and the like are developed in the system memory 52. The system control unit 50 also performs display control by controlling the memory 32, D/A converter 13, display unit 28, and the like.

The mode change-over switch 60, a first shutter switch 62, a second shutter switch 64, and the operation unit 70 are operation units for inputting various kinds of operation instructions to the system control unit 50.

The mode change-over switch 60 switches the operation mode of the system control unit 50 to one of a photographic mode in which still images and motion images are recorded, a reproducing mode in which images are displayed or otherwise output, and the like. The first shutter switch 62 is turned on in the halfway operation of the shutter button 61 provided for the digital camera 100, that is, in what is called a half depression state (which could be said to be a photography preparation operation instruction by a user) and generates a first shutter switch signal SW1. The operations such as AF (autofocus) processing, AE (autoexposure) processing, AWB (auto white balance) processing, EF (flash light pre-emitting) processing, and the like (any one of those processings is called a photography preparation operation hereinbelow) are started by the first shutter switch signal SW1. Those processings are executed under control of the system control unit 50.

The second shutter switch 64 is turned on when the operation of the shutter button 61 is completed, that is, when the full depression state (photographing instruction) is attained to generate a second shutter switch signal SW2. In response to the second shutter switch signal SW2, the system control unit 50 starts the operation of a series of photographic processes from a process of reading out the signal from the image pickup unit 22 up to a process of writing the image data into a recording medium 200.

By selecting various kinds of function icons displayed on the display unit 28 or the like, an appropriate function is allocated to each operation member of the operation unit 70 for a number of scenes that are likely to be photographed or a number of operations that a user is likely to wish to perform, so that the operation members function as various kinds of function buttons. Function buttons may include, for example: an end button, a back button, an image feed button, a jump button, a limit button, an attribute change button, and so on. For example, when the menu button is pressed, various kinds of menu display screens which can be set are displayed on the display unit 28. The user can intuitively make various kinds of settings by using the menu display screens displayed on the display unit 28, a four-way operational button and a SET button.

The controller wheel 73 is a rotatable operation member included in the operation unit 70 and is used together with a direction button or the like to enable the selection of a selection item by a user.

A power supply control unit 80 is constructed with a battery detecting circuit, a DC/DC (direct current) converter, a switching circuit for switching a block to be turned on, and it detects the presence or absence of an attached battery, a type of battery, and a remaining battery capacity. The power control unit 80 controls the DC/DC converter on the basis of detection results and an instruction from the system control unit 50 and supplies a necessary voltage for a necessary period of time to each unit including the recording medium 200.

A power supply unit 30 comprises a primary battery such as alkaline battery, lithium battery, or the like, a secondary battery such as NiCd battery, NiMH battery, Li battery, or the like, an AC adapter, and the like. An interface 18 with the recording medium 200 such as memory card or hard disk is provided. The recording medium 200 is a recording medium such as a memory card and is constructed with a semiconductor memory, a magnetic disk, or the like.

As one operation unit 70, the apparatus has a touch panel (also referred to herein as a touch operation member) which is arranged to detect a touch operation (by a user) applied to the display unit 28. The touch panel and the display unit 28 can be integratedly constructed. For example, the touch panel can be attached to an upper layer of a display surface of the display unit 28 in such a manner that the touch panel has a light transmittance characteristic that means that it does not obstruct the display of the display unit 28. Input coordinates on the touch panel and display coordinates on the display unit 28 are made to correspond to each other. Thus, a GUI (graphical user interface) can be constructed as if the user could directly operate the screen displayed on the display unit 28. The system control unit 50 is arranged to detect the following operations applied to the touch panel: that is, a finger or a pen touches the touch panel (hereinbelow referred to as "touchdown"); a state where the finger or pen is in contact with the touch panel (hereinbelow referred to as "touch-on"); a state where the finger or pen is moved while in contact with the touch panel (hereinbelow referred to as "move"); the finger or pen which is in contact with the touch panel loses contact therewith (hereinbelow, referred to as "touch-up"); and a state where nothing is in contact with the touch panel (hereinbelow, referred to as "touch-off"). Those operations and the coordinates of the position where the finger or pen is in contact with the touch panel are notified to the system control unit 50 through an internal bus 111 (shown in FIG. 1). On the basis of the notified information, the system control unit 50 determines which kind of operation has been performed on the touch panel. With respect to "move", a moving direction of the finger or pen which is moved on the touch panel can be determined for every vertical and/or horizontal component on the touch panel on the basis of a change in position coordinates. It is assumed that when "touch-up" has been performed on the touch panel after a predetermined "move" following "touch-down", a stroke is done. The operation for rapidly doing the stroke is called a "flick". "Flick" is such an operation wherein a state in which the finger is in contact with the touch panel, the finger is rapidly moved on the touch panel over a certain distance and is separated therefrom at this position (a the certain distance away from its "touch-down position"). In other words, it is an operation wherein the surface on the touch panel is rapidly traced with the finger. When it is detected that the finger is moved at a predetermined speed or higher and over at least a predetermined distance and "touch-up" is detected in that condition, it is determined that a "flick" has been performed. On the other hand, it is assumed that when it is detected that the finger is moved at a speed lower than the predetermined speed and over at least the predetermined distance, it is to be determined that a "drag" has been performed. A touch panel of any type may be considered such as a resistance film type, an electric capacity type, a surface acoustic wave type, an infrared-ray type, an electromagnetic induction type, an image recognition type, a photosensor type, and so on.

The operation of each embodiment of the invention will be described hereinbelow with reference to flowcharts illustrated in the accompanying figures.

First Embodiment

In the first embodiment, an example will be described in which the photographic preparation operation is executed by a user performing "touch-down" onto the shutter icon displayed on the touch panel and, thereafter, the photographing process is executed by performing "touch-up" on the shutter icon.

Figure 3:
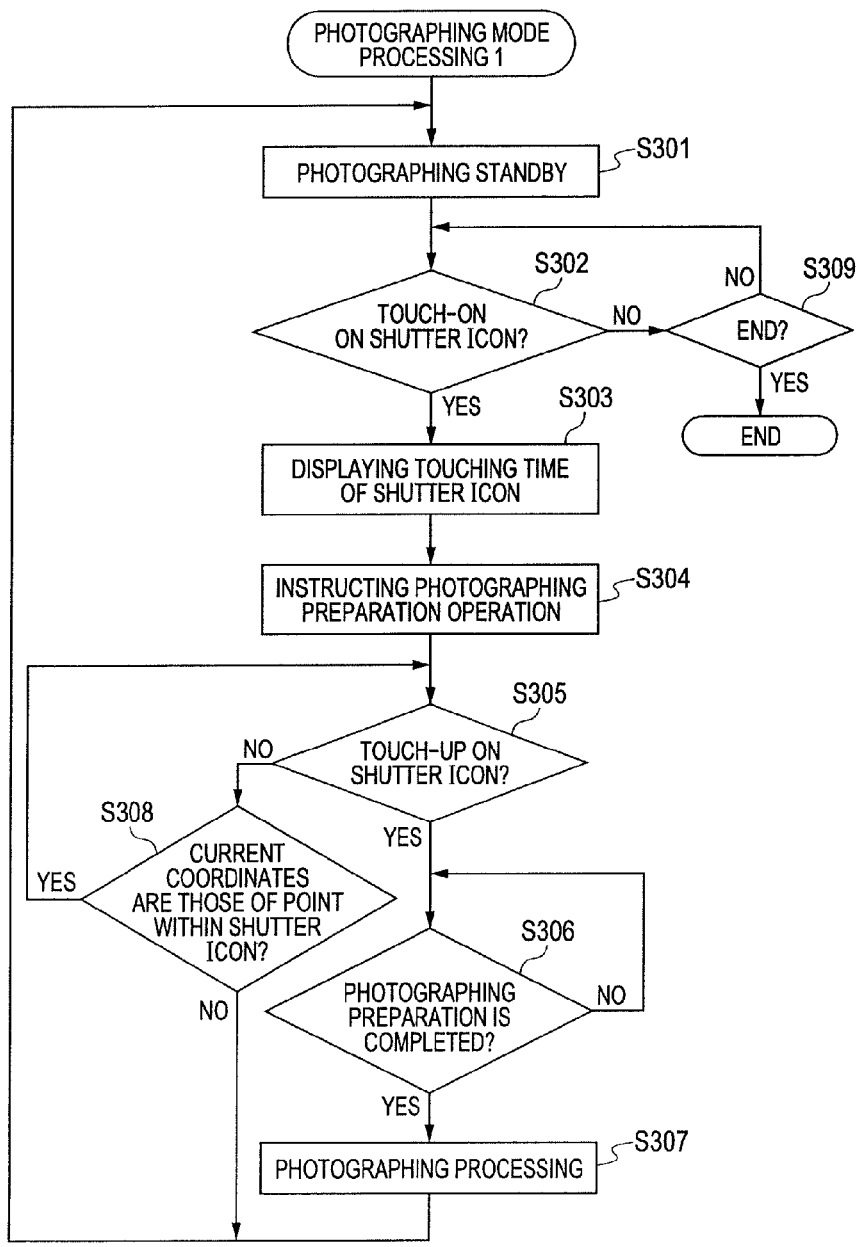
FIG. 3 is a flowchart of a processing procedure of a photographic mode of a first embodiment.

FIG. 3 illustrates a flowchart for a photographic mode process 1 as a process in the photographic mode of the first embodiment. The photographic mode process 1 is realized by a method whereby the system control unit 50 develops the program recorded in the non-volatile memory 56 into the system memory 52 and executes it.

When a power source is turned on and the operating mode of the digital camera 100 is switched to the photographing mode by the mode change-over switch 60, the photographic mode processing 1 is started.

Figure 9A:
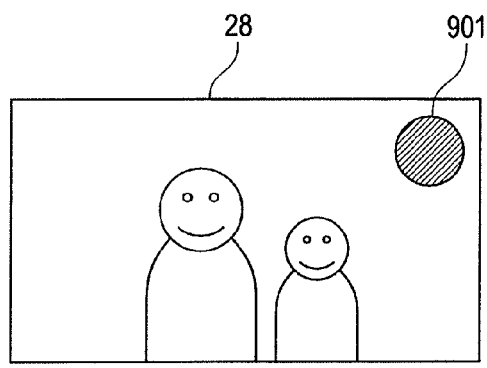
FIGS. 9A and 9B are diagrams each illustrating a display example of a display unit displaying a shutter icon.

In step S301, first, a process for a photographic standby is executed. In the photographic standby process, a through-image display in which the images picked up by the image pickup unit 22 are sequentially displayed on the display unit 28 is executed (the displayed image that is superimposed over the picked up images is referred to as a "through image" because it allows the picked-up images to be seen through it). A touch icon is superimposed on the through image and displayed. A display example at this time is illustrated in FIG. 9A. The through image is displayed on the display unit 28 and a shutter icon 901 is superimposed and displayed. As will be described hereinafter, the user enables the photographic preparation operation to be executed by touching the shutter icon 901. and the user can then photograph and record an image by removing their finger from the shutter icon 901. The photographing standby processing includes: various kinds of setting processings (for example, a selection of a forced flash light emission, no flash, and an automatic flash, a selection of one central point AF, a face priority AF, an artificial intelligence-auto focus (AiAF), and the like) regarding the photographing according to the operation of the user; and a setting processing regarding the operation of the digital camera 100.

In S302, whether or not "touch-on" has been performed to an area where the shutter icon 901 is displayed in the display unit 28 is discriminated. "Touch-on" to the shutter icon 901 includes a case where "touch-down" is performed onto the shutter icon 901 and a case where the touch position enters the area of the shutter icon 901 through "move" from a "touch-down" at a position outside of the shutter icon 901. If there is "touch-down" onto the shutter icon 901, the processing routine advances to S303. If there is no "touch-down" to the shutter icon 901, the processing routine advances to S309.

Figure 9B:
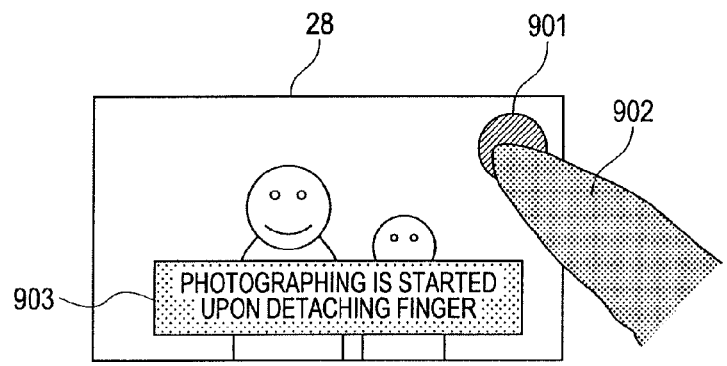

In S303, a message showing that the shutter icon 901 is touched is displayed. A display example of the display unit 28 at this time is illustrated in FIG. 9B. First, in order to allow the user to recognize a state where the shutter icon 901 has been touched by a finger 902 or the like, a display format (color, frame, or the like) of the shutter icon 901 is set to a display format different from that (FIG. 9A) in S301. Further, by removing the finger from the touch screen at that position, in other words, if "touch-up" is performed at the position of the shutter icon 901, a guidance 903 showing that the photography can be performed is displayed.

In S304, control is made so as to start the photographing preparation operation. As mentioned above, the photographing preparation operation is an operation including at least one of the AF, AE, AWB, and EF. A position in the picked-up image where the photographic preparation operation should be adjusted is determined based on settings which have previously been selected by the user. For example, a desired one of a mode in which the photographic preparation operation is adjusted in accordance with one central point (one central point AF or the like) and a mode in which the image picked up by the image pickup unit 22 is evaluated and the photographic preparation operation is adjusted in accordance with the decided object (AiAF, one central point AF or the like), and so on can be preliminarily selected and set. It is also possible to construct the photographic preparation operation in such a manner that the SW1 signal is generated and the start of the photographic preparation operation is instructed in a manner similar to the case where the shutter button 61 has been half-depressed or that another signal different from the SW1 signal is generated and the start of the photographic preparation operation is instructed thereby. When the photographic preparation operation is completed, the fact that the photographic preparation operation has been completed is notified to the user using a display of an in-focus frame, a generation of an in-focus sound, or the like. Photographic setting values such as focus position, exposure value, and the like adjusted by the photographic preparation operation are fixed (locked) until "touch-up" is detected or until "touch" on the shutter icon is no longer detected. When the photographic preparation operation is started, even if the photographic preparation operation is not completed, the processing routine advances to S305.

In S305, whether or not "touch-up" on the shutter icon 901 has been detected is discriminated. This processing corresponds to a discrimination of whether or not "touch-up" has been detected in a state where a position in the area (in the display unit 28) where the shutter icon 901 is displayed is detected as a touch position. If "touch-up" on the shutter icon 901 is detected, S306 follows. If "touch-up" on the shutter icon 901 is not detected, S308 follows.

In S306, whether or not the photographic preparation operation started in S304 has been completed is discriminated. If it is determined that the photographic preparation operation is not completed, the apparatus waits until it is completed. If it is determined that the photographic preparation operation has been completed, S307 follows.

In S307, the photographic process is executed based on the current photographic setting values. The photographic process comprises a series of photographic processes from a process in which the signal is read out of the image pickup unit 22 mentioned above up to a process in which the image data is written into the recording medium 200. The photographic processing also includes "rec review" in which the photographed image is displayed on the display unit immediately after being photographed. It is also possible that the photographic process is arranged in such a manner that the SW2 signal is generated and the start of the photographic preparation operation is instructed in a manner similar to the case where the shutter button 61 has been fully depressed or that another signal different from the SW2 signal is generated and the start of the photographic preparation operation is instructed. When the photographic process is finished in S307, the processing routine is returned to S301 and the apparatus enters the photographing standby mode.

In S308, whether or not the current touch position is located on the shutter icon is discriminated. If it is determined that the current touch position is located on the shutter icon, the processing routine is returned to S305 and the apparatus subsequently waits for "touch-up" such that the photographic processing is instructed. If it is determined that the current touch position is not located on the shutter icon, the photographic setting values adjusted by the photographic preparation operation are cancelled (cleared). The display of the shutter icon touching, continued to be displayed since S303, is finished. The apparatus is then returned to the photographic standby mode in S301. At this time, since the display contents of the display unit 28 are switched from the state of FIG. 9B to the state of FIG. 9A, the user can readily identify that the photographic preparation operation has been cancelled.

In S309, it is discriminated whether or not an end instruction such that the power source is turned off, the operating mode is switched to another mode by the mode change-over switch 61, or the like has been made. If it is determined that there is no end instruction, the processing routine is returned to S302. If it is determined that the end instruction has been made, the photographic mode process 1 is finished.

According to the first embodiment described above, the user can lock the photographic setting values in accordance with the photographic preparation operation by touching the shutter icon displayed on the display unit 28 and the user can allow the photography to be executed by detaching the finger from the shutter icon at an arbitrary timing. Since the photography is executed merely by removing from the screen the touched finger as mentioned above, there is no need to apply a force to the camera and thus a possibility of the camera being shaken due to the user's operation can be reduced. Also as compared with a camera of a type such that the photography is executed in accordance with a difference of the area or pressure of the finger which is touching the touch panel, it is sufficient in the present invention that a force which may be applied to the digital camera 100 is small. Therefore, the possibility of occurrence of the camera shaking, caused by the user's operation, can be also reduced. Further, even if a result of the photographic preparation operation according to "touch-down" is unintentional (for example, in the case where an in-focus of an unintentional object is obtained, or the like), by deviating the touched finger from the position of the shutter icon, the photographic preparation operation can be cancelled by deviating the touched finger from the position of the shutter icon without executing the unintentional photographing. As to the user's operation, the shutter icon is touched to instruct the photographic preparation operation, and in the case of photographing in that condition, it is sufficient to remove the finger. The photographic preparation operation can be cancelled merely by deviating the finger from the position of the shutter icon, and if the finger is returned so that the touch position again coincides with the position of the shutter icon without removing the touched finger, the photographic preparation operation can be executed again. In this manner, the simple and intuitive operating method will be provided.

Second Embodiment

In a second embodiment, an example in which the photographic preparation operation is cancelled when "touch-up" is detected at a position out of the area of the shutter icon will be described. The second embodiment differs from the first embodiment with respect to the following point. That is, in the first embodiment, at a point in time when the touch position is moved to a position out of the area of the shutter icon, even if "touch-off" is not performed, the photographic preparation operation is cancelled. On the other hand, in the second embodiment, at the point in time when the touch position has been moved to the position outside of the area of the shutter icon, the photographic preparation operation is not cancelled, but when "touch-up" is subsequently detected at the position outside of the area of the shutter icon, the photographic preparation operation is cancelled.

Figure 4:
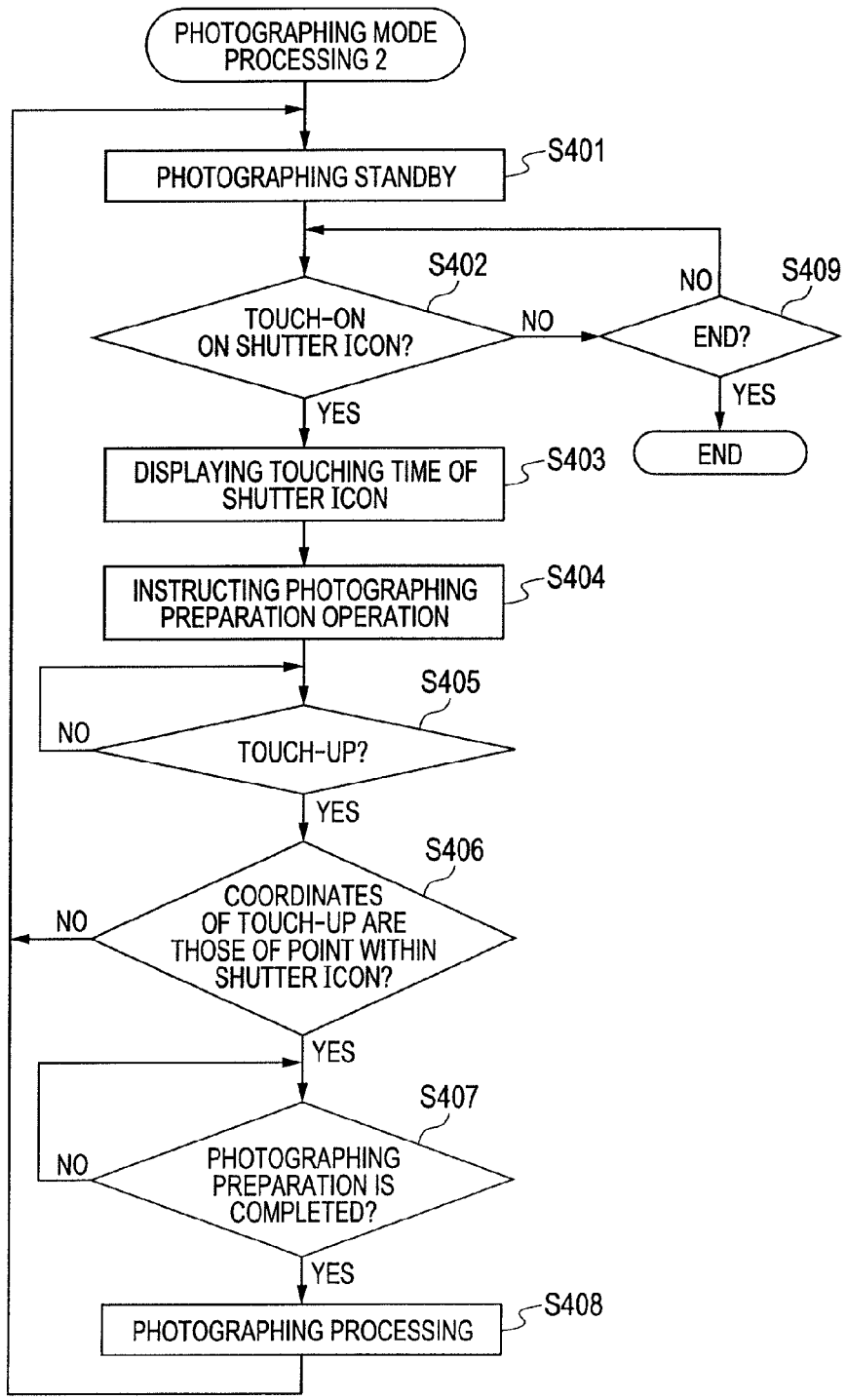
FIG. 4 is a flowchart of a processing procedure of a photographic mode of a second embodiment.

FIG. 4 illustrates a flowchart of a photographic mode process 2 as a process in a photographic mode of the second embodiment. The photographic mode process 2 is realized by a method whereby the system control unit 50 develops the program recorded in the non-volatile memory 56 into the system memory 52 and executes it.

Since S401 to S404 are similar to the processes of S301 to S304 mentioned in FIG. 3, their description is omitted here.

In S405, whether or not "touch-up" is detected is discriminated. If "touch-up" is not detected, the apparatus waits until "touch-up" is detected in S405. That is, until "touch-up" is detected, the photographic preparation operation which is executed once is not cancelled irrespective of the touch position. When "touch-up" is detected in S405, the processing routine advances to S406.

In S406, it is discriminated whether or not the touch position immediately before "touch-up" is detected ("touch-up" position) is located in the area of the shutter icon. If it is determined that the "touch-up" position lies within the area of the shutter icon, S407 follows. If it is determined that the "touch-up" position is outside of the area of the shutter icon, the photographic setting values adjusted by the photographic preparation operation are cancelled (cleared) without executing the photographic process. The display relating to the touch of the shutter icon, which has continued to be displayed since S403, is finished and the apparatus is returned to the photographic standby mode in S401. At this time, since the display contents of the display unit 28 are switched from the state of FIG. 9B to the state of FIG. 9A, the user can recognize a fact that the photographic preparation operation is cancelled (stopped).

In S407, whether or not the photographic preparation operation started in S404 is completed is discriminated. If it is determined that the photographing preparation operation is not completed yet, the apparatus waits until it is completed. If it is determined that the photographic preparation operation has been completed, S408 follows.

In S408, the photographic process is executed based on the current photographic setting values. This processing is similar to that of S307 in FIG. 3. When the photographing processing in S408 is finished, the processing routine is returned to S401 and the apparatus enters the photographic standby mode.

Since the processing of S409 is similar to that of S309 in FIG. 3, its description is omitted here.

According to the second embodiment, even if the touch position is erroneously deviated after the shutter icon is touched, the photographic setting performed by the photographic preparation operation is not readily changed. Therefore, if "touch-up" is performed after the finger is again returned to the position of the shutter icon without detaching the finger, the photography can be performed based on the fixed photographic setting. If the user wants to execute the photographic preparation operation again after the shutter icon is touched, by executing the moving operation to a position outside of the shutter icon and, thereafter, performing "touch-up", the photographic preparation operation can be cancelled without executing the unintentional photography. Further, in a manner similar to the first embodiment, the possibility of occurrence of the camera shaking can be reduced and the simple and intuitive operating method can be provided.

Third Embodiment

In a third embodiment, an example in which the shutter icon is not displayed but the start of the photographic preparation operation can be instructed by touching an arbitrary position on the through image displayed on the display unit 28 will be described. The photographic preparation operation which is started once may be cancelled when a distance between the "touch-down" position and the "touch-up" position is equal to or larger than a predetermined distance.

FIG. 5 illustrates a flowchart of a photographic mode process 3 as a process in a photographic mode of the third embodiment. The photographic mode process 3 is realized by a method whereby the system control unit 50 develops the program recorded in the non-volatile memory 56 into the system memory 52 and executes it.

Since S501 is similar to the processing of S301 mentioned with regard to FIG. 3, its description is omitted here. However, the shutter icon is not displayed in the present embodiment.

In S502, it is discriminated whether or not "touch-down" is performed in the area (within the through image) where the through image is displayed in the display unit 28. In the case where the through image is displayed in a range narrower than the whole display available range of the display unit 28, if "touch-down" has been performed in an outside area of the through image in the display unit 28, it is determined that there is no "touch-down" on the through image. It may also be decided that "touch-down" onto an icon or the like which is displayed superimposed on the through image is not "touch-down" on the through image. If it is determined that there is no "touch-down" on the through image, the processing routine advances to S510 and, thereafter, the apparatus waits for "touch-down" on the through image again in S502. If it is determined that "touch-down" on the through image has been performed, the processing routine advances to S503.

In S503, a message showing that a position in the through image has been touched is displayed. Further, a guidance is displayed showing that if the finger is removed from the through image, that is, if "touch-up" is performed, the photographing can be performed. At this time, it is better to display a guidance of an operating method showing how the photographic preparation operation which is instructed by "touch-down" can be cancelled.

In S504, the touch position (initial coordinates) of "touch-down", which is determined to be "touch-down" within the through image in S502, is stored in the system memory 52.

In S505, control is made so as to start the photographic preparation operation. The photographic preparation operation is an operation including at least one of the AF, AE, AWB, and EF as mentioned above. The photographic preparation operation in S505 is adjusted in accordance with the object at the "touch-down" position in the through image (on the basis of a result obtained by evaluating the area around the "touch-down" position). For example, if a face is detected in the area around the "touch-down" position, the AF, AE, AWB, and EF are executed according to the face. The object at the "touch-down" position is not limited to the face. Even if there is no face, for example, the AF is performed so that a contrast of the area around the "touch-down" position becomes maximum. When the photographic preparation operation is completed, the fact that the photographic preparation operation is completed is notified to the user by a display of an in-focus frame, a generation of an in-focus sound, or the like. The photographic setting values such as focus position, exposure value, and the like which are adjusted in the photographic preparation operation are fixed (locked) until "touch-up" is detected or until the touch on the shutter icon is no longer detected. Alternatively, if the object at the "touch-down" position may be tracked, the photographic preparation operation may be continuously executed in such a manner that the object at the "touch-down" position is tracked and the photographic setting always conforms with the object which is being tracked. When the photographic preparation operation is started, even if the photographic preparation operation is not completed, the processing routine advances to S506.

In S506, whether or not "touch-up" has been detected is discriminated. If "touch-up" is not detected, the apparatus waits until "touch-up" is detected in S506. That is, until "touch-up" is detected, the photographic preparation operation which is executed once is not cancelled irrespective of the touch position. When "touch-up" is detected in S506, the processing routine advances to S507.

In S507, whether or not a difference between the touch position (initial coordinates) at the time of "touch-down" and the touch position (last coordinates) immediately before the "touch-up" is performed exceeds a predetermined threshold value is determined. That is, whether or not |last coordinates−initial coordinates|>threshold value is determined. If it does not exceed the threshold value, S508 follows. If it exceeds the threshold value, the photographic setting values adjusted in the photographic preparation operation are cancelled (cleared) without executing the photographic processing. The display which is continued to be displayed since S503 and which indicates that the area in the through image is touched is finished and the apparatus is returned to the photographic standby mode in S501.

In S508, whether or not the photographing preparation operation started in S505 is completed is discriminated. If it is decided that the photographing preparation operation is not completed, the apparatus waits until it is completed. If it is decided that the photographing preparation operation is completed, S509 follows.

In S509, the photographing processing is executed based on the current photographic setting values. This processing is similar to that of S307 in FIG. 3. When the photographic processing of S509 is finished, the processing routine is returned to S501 and the apparatus enters the photographic standby mode.

Since the processing of S510 is similar to that of S309 in FIG. 3, its description is omitted here.

Although the description has been made on the assumption that the photographic process is executed after waiting for completion of the photographic preparation operation in S508, the following construction may be also used. That is, as long as the photographic preparation operation which is executed in S505 is continuously executed in accordance with the object which is being tracked, the photographic process may be executed without making the discrimination of whether or not the photographic preparation operation is completed.

According to the third embodiment, since the designation of the object to which the user wants to adjust the photographic setting in the photographic preparation operation, and the designation of the start of the photographic preparation operation can be simultaneously performed by "touch-down" on the through image, the number of operations which the user should perform can be reduced. Since S507 is provided, by performing "touch-up" after "move" is largely performed from the "touch-down" position, the photographic preparation operation can be cancelled without performing unintentional photography, or the object designated as an object to which the photographic setting should be adjusted can be changed. Further, in a manner similar to the first embodiment, the possibility of occurrence of the camera shaking can be reduced and the simple and intuitive operating method can be provided.

Fourth Embodiment

In a fourth embodiment, an example will be described in which the start of the photographic preparation operation can be instructed by the operation similar to that in the third embodiment and when the touch position is moved to a predetermined area, the photographic preparation operation is cancelled.

FIG. 6 illustrates a flowchart of a photographic mode process 4 as a process in a photographing mode in the fourth embodiment. The photographic mode process 4 is realized by a method whereby the system control unit 50 develops the program recorded in the non-volatile memory 56 into the system memory 52 and executes it.

Since S601 to S603 and S609 are similar to the processings of S501 to S503 and S510 mentioned in FIG. 5, their description is omitted here.

In S604, control is made so as to start the photographic preparation operation. This process is similar to S505 in FIG. 5.

In S605, whether or not "touch-up" has been detected is discriminated. If "touch-up" has been detected, S606 follows. If "touch-up" is not detected, S608 follows. Since S606 and S607 are similar to the processings of S508 and S509 in FIG. 5, their description is omitted here.

In S608, whether or not the coordinates of the detected current touch position are coordinates of a point within a cancel area set in the display unit 28 is discriminated. If it is determined that they do not lie within the cancel area, the processing routine is returned to S605. If it is determined that they do lie within the cancel area, the photographic setting values adjusted in the photographic preparation operation are cancelled (cleared) without executing the photographic process. The display upon touching of the point in the through image which is performed from S603 is finished and the apparatus is returned to the photographing standby mode in S601.

Figure 10A:
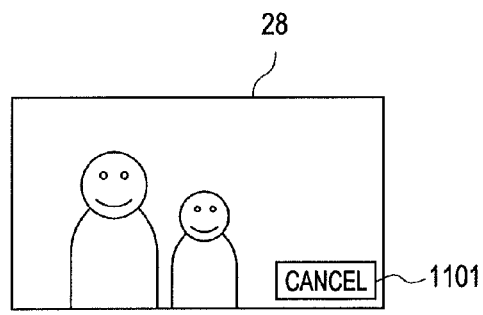
FIGS. 10A, 10B and 10C are diagrams each illustrating an example of a cancel area set into the display unit.
Figure 10B:
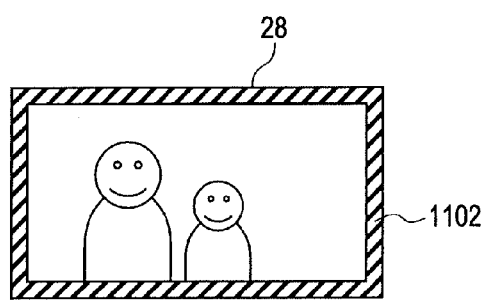
Figure 10C:
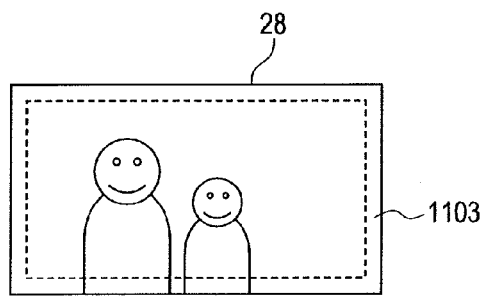

Each of FIGS. 10A to 10C illustrates an example of the cancel area set in the display unit 28. FIG. 10A is the example in which a cancel area 1101 is superimposed on the through image and is explicitly displayed as a display item. If the cancel area is explicitly displayed as illustrated in FIG. 10A, the user can easily cancel the photographic preparation operation even if he has not yet well practised operating the digital camera.

FIG. 10B is an example in which the image is displayed in such a manner that a displayed image is slightly smaller than the whole of an area in the display unit 28, where the touch position can be detected, the through image is not displayed, and an edge portion of the display unit 28, where the touch position can be detected is set to a cancel area 1102. The cancel area 1102 is displayed in a specific color, or displayed with character information so that the user can identify it. If the cancel area is explicitly set in the edge portion of the display unit 28 as illustrated in FIG. 10B, the user can easily cancel the photographic preparation operation even if he has not yet well practised operating the digital camera. Further, the display of the through image is not obstructed, thus a degree of freedom is improved of the position which can be designated by the user as a position at which the photographic setting in the photographic preparation operation should be adjusted.

FIG. 10C is an example in which the edge portion where the through image is displayed in the display unit 28 is set to a cancel area 1103. An area between a broken line illustrated in the diagram and the edge of the display unit 28 is the cancel area, while the broken line illustrated in the diagram is not actually displayed. If the cancel area is set as illustrated in FIG. 10C, the display of the through image is not obstructed and thus the degree of freedom is improved in a manner similar to FIG. 10B of the position which can be designated by the user as a position at which the photographing setting in the photographing preparation operation should be adjusted. Further, since the through image can be displayed larger than that in the example as illustrated in FIG. 10B, the user can designate further precisely the position at which the photographic setting should be adjusted based on the display of the enlarged through image.

According to the fourth embodiment, since the designation of the object at which the user wants to adjust the photographic setting in the photographic preparation operation and the designation of the start of the photographic preparation operation can be simultaneously attained by "touch-down" on the through image, the number of operations which the user is required to perform can be reduced. Since S608 is provided, merely by moving the touch position to the cancel area after the photographing preparation operation is started by "touch-down", the photographic preparation operation can be cancelled without performing unintentional photography. Further, in a manner similar to the first embodiment, the possibility of occurrence of the camera shaking can be reduced and the simple and intuitive operating method can be provided.

Fifth Embodiment

In an fifth embodiment, an example will be described in which the start of the photographic preparation operation can be instructed by the operation similar to that in the third embodiment and, when a flicking operation is detected, the photographic preparation operation is cancelled.

FIG. 7 illustrates a flowchart of a photographic mode process 5 as a process in a photographic mode according to the fifth embodiment. The photographic mode process 5 is realized by a method whereby the system control unit 50 develops the program recorded in the non-volatile memory 56 into the system memory 52 and executes it.

Since S701 to S703 are similar to the processes of S501 to S503 mentioned with respect to FIG. 5, their description is omitted here. Since S704 and S705 are similar to the processes of S505 and S506 mentioned with respect to FIG. 5, their description is omitted here.

In S706, whether or not "touch-up" detected in S705 is performed by the flicking operation is discriminated. More specifically speaking, it is determined whether or not a state where the finger is moved at at least a predetermined speed over at least a predetermined distance has been detected and then "touch-up" is detected in that condition. If it is determined that "touch-up" is performed in the flicking operation, the photographic setting values adjusted by the photographic preparation operation are cancelled (cleared) without executing the photographic process. The display effected upon touching of the point within the through image, which is continued to be displayed since S703, is finished and the apparatus is returned to the photographic standby mode in S701. If it is determined that "touch-up" is not performed by the flicking operation, S707 follows. Since S707, S708, and S709 are similar to the processes of S508, S509, and S510 mentioned with respect to FIG. 5, their description is omitted here.

According to the fifth embodiment, since the designation of the object to which the user wants to adjust the photographic setting in the photographic preparation operation and the designation of the start of the photographic preparation operation can be simultaneously attained by "touch-down" on the through image, the number of operations which the user is required to perform can be reduced. Since S706 is provided merely by executing the flicking operation after the photographic preparation operation is started by "touch-down", the photographic preparation operation can be cancelled without performing unintentional photography. Further, in a manner similar to the first embodiment, the possibility of occurrence of the camera shaking can be reduced and the simple and intuitive operating method can be provided.

Sixth Embodiment

In an sixth embodiment, an example will be described in which the start of the photographic preparation operation can be instructed by an operation similar to that of the third embodiment by using the touch panel which can simultaneously detect the touches applied to a plurality of positions and in which the photographic preparation operation is cancelled by detecting a plurality of touches.

FIG. 8 illustrates a flowchart of a photographic mode process 6 as a process in a photographic mode of the sixth embodiment. The photographic mode process 6 is realized by a method whereby the system control unit 50 develops the program recorded in the non-volatile memory 56 into the system memory 52 and executes it.

Since S801 to S803 are similar to the processes of S501 to S503 mentioned with respect to FIG. 5, their description is omitted here. Since S804 is similar to the processing of S505 mentioned with respect to FIG. 5, its description is omitted here.

In S805, whether or not "touch-up" is detected is discriminated. If "touch-up" is detected, S806 follows. If "touch-up" is not detected, S808 follows. Since S806 and S807 are similar to the processings of S508 and S509 in FIG. 5, their description is omitted here.

In S808, it is determined whether or not "touch-down" at the second point different from the touch at a first point is detected at the same time as a continuing "touch-on" (touch at the first point) is detected continuing the "touch-down" detected in S802. If "touch-down" at the second point is not detected, the processing routine is returned to S805. If it is determined that "touch-down" at the second point is detected, the photographic setting values adjusted in the photographic preparation operation are cancelled (cleared) without executing the photographing processing. The display effected upon touching of the point within the through image, which has continued to be displayed since S803, is finished and the apparatus is returned to the photographic standby mode in S801.

The sixth embodiment may be applied to a touch panel different from the touch panel which can simultaneously detect the touches applied to a plurality of positions therein, by replacing the discrimination of S808 with a discrimination of whether "touch-down" of the second point substantially is performed. For example, for a touch panel of the resistance film type, when two points are simultaneously touched, only an intermediate point between the two points is detected as a touch position. Therefore, after the first point is touched, when the second point then is touched while keeping the touch state of the first point, the touch position which is detected changes instantaneously from the position where the first point is touched to the position of the intermediate point between the first point and the second point without detection of "touch-up". By using such a feature, it is also possible to determine in such a manner that if the touch position detected so far in S808 is moved by a predetermined distance or more within a predetermined time (that is, instantaneously), "touch-down" of the second point is considered to be performed.

According to the sixth embodiment, since the designation of the object at which the user wants to adjust the photographic setting in the photographic preparation operation and the designation of the start of the photographic preparation operation can be simultaneously performed by "touch-down" on the through image, the number of operations which the user is required to perform can be reduced. Since S808 is provided, merely by touching one more position after the photographic preparation operation is started by "touch-down", the photographic preparation operation can be cancelled without performing unintentional photography. Further, in a manner similar to the first embodiment, the possibility of occurrence of the camera shaking can be reduced and the simple and intuitive operating method can be provided.

According to each of the embodiments described above, the photographic preparation operation instruction corresponding to the instruction by SW1 in the related art and the photographing instruction (SW2) corresponding to the instruction by SW2 in the related art can be performed by the touch operation with the high operability while avoiding that the camera is shaken due to the user's touch operation.

The receiving method of the photographic preparation operation instruction, the receiving method of the photographic instruction, and the cancelling method of the photographic preparation operation described in the foregoing embodiments (and illustrated in FIGS. 3 to 8) can be combined. For example, the method of making the photographic preparation operation instructed by performing "touch-on" on the shutter icon illustrated in FIGS. 3 and 4 can be also used in combination with the receiving method of the photographic instruction and the cancelling method of the photographic preparation operation in any of FIGS. 3 to 8. The method of simultaneously performing the reception of the photographic preparation operation instruction and the reception of the designation of the object at which the user wants to adjust the photographic setting illustrated in FIGS. 5 to 8 can be also used in combination with the receiving method of the photographic instruction and the cancelling method of the photographic preparation operation in any of FIGS. 5 to 8. Further, by assuming that if "touch-down" applied to an arbitrary position on the touch panel is detected, the photographic preparation operation instruction is received and such a receiving method may be also used in combination with the receiving method of the photographic instruction and the cancelling method of the photographic preparation operation in any of FIGS. 5 to 8.

Although the example in which the photographic preparation operation instruction and the photographic instruction are made by the operation which is applied to the touch panel has been described in the foregoing embodiments (FIGS. 3 to 8), naturally, the photographic preparation operation instruction and the photographic instruction may be also made by the operation which is applied to the shutter button 61 during the processing of FIGS. 3 to 8. Since the photographic preparation operation instruction and the photographic instruction may be made even by the shutter button 61, the processes in the foregoing embodiments (FIGS. 3 to 8) are not always executed but the processes in any of FIGS. 3 to 8 may be executed only when the digital camera 100 satisfies a specific condition. For example, in the case where the apparatus has an orientation detecting sensor (orientation detecting unit such as a 3-way acceleration sensor or the like) which can detect an orientation of the digital camera 100 with respect to the direction of gravity, the apparatus may be also constructed as follows. It is assumed that when the digital camera 100 is laid on its side (normal position), the processings of FIGS. 3 to 8 are not executed. That is, the photographic preparation operation instruction and the photographic instruction are not received as the operation applied to the touch panel, and if the processes of FIG. 3 or 4 are applied, the shutter icon is not displayed either. It is also assumed that if it is detected by the orientation detecting sensor that the digital camera 100 has taken a vertically-standing position (vertical position), the photographic preparation operation instruction and the photographic instruction are received as the operation applied to the touch panel as shown in the processings of FIGS. 3 to 8. At this time, a message showing that the photographic preparation operation instruction and the photographic instruction can be received as the operation applied to the touch panel is displayed on the display unit 28 (if the processings of FIG. 3 or 4 are applied, the shutter icon is displayed). By constructing the camera as mentioned above, even if it is difficult to depress the shutter button 61 because the digital camera 100 is held at the vertically-standing position, the photographic preparation operation instruction and the photographic instruction can be easily made as the operation applied to the touch panel.

In each of the foregoing embodiments (FIGS. 3 to 8), since the photographic preparation operation instruction and the photographic instruction may be made as the operation applied to the touch panel, a construction in which the shutter button 61 of the push-button type is not included on the digital camera 100 may be also used. By using such a construction, the construction of the digital camera can be simplified and the apparatus can be miniaturized and its costs can be reduced.

Figure 11:
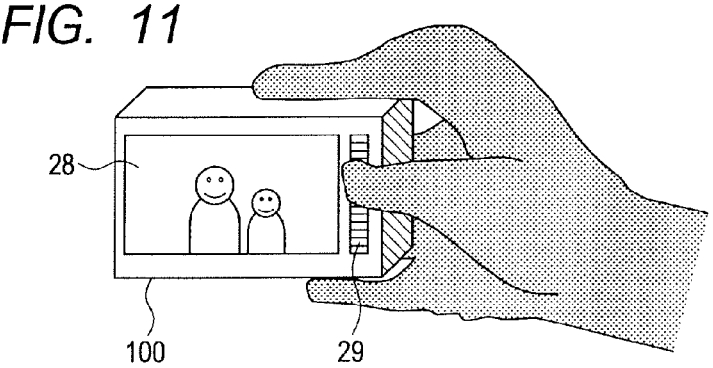
FIG. 11 is a diagram illustrating an example of a line touch sensor.

Further, although the example using the touch panel has been described in each of the foregoing embodiments, the invention is not limited to it. Even in the case of a line touch sensor which can detect the touch operation and the touch position, the reception of the photographic preparation operation instruction by "touch-down" and the reception of the photographic instruction by the method illustrated in FIGS. 3 to 8 may be attained. In the line touch sensor, since the shutter icon is not displayed, it is assumed that the photographic preparation operation instruction is received by "touch-down" applied to an arbitrary position on the line touch sensor. FIG. 11 illustrates an example of a line touch sensor. A line touch sensor 29 is an operation member arranged at a position different from the display unit 28. The line touch sensor 29 can detect the presence or absence of the touch on the line touch sensor 29 and the touch position, "touch-on", "touch-down", "move", "flick", "touch-up", and "touch-off" can be detected in a manner similar to the touch panel. The line touch sensor may be constructed by a single sensor or by arranging a plurality of touch sensors.

In the case of using the construction in which the photographic preparation operation instruction is received by "touch-down" applied to an arbitrary position on the touch sensor or the line touch sensor, it is not always necessary to display the through image. Thus, the invention can be also applied to the photography using a finder (including an optical finder or an electronic viewfinder) which is arranged such that the user looks thereinto.

The system control unit 50 may be controlled by one controller or the whole apparatus may be controlled by sharing the processes by a plurality of controllers.

Although the invention has been described in detail above on the basis of its exemplary embodiments, the invention is not limited to those specific embodiments but various modifications within the scope without departing from the essence of the invention are also incorporated. Further, each of the foregoing embodiments has merely been described with respect to an embodiment of the invention and those embodiments can be combined.

Although the above embodiments have been described as an example with respect to the case of applying the invention to the digital camera, the invention can be also applied to any apparatus such as a digital still camera, a digital video camera, and a digital single-lens reflex camera which can detect the touch operation, and other image pickup apparatuses which can detect the touch operation.

The invention is also realized by executing the following processings. That is, software (program) for realizing the functions of the embodiments mentioned above is supplied to a system or an apparatus through a network or various kinds of storage media and a computer (or a central processing unit (CPU), a micro processing unit (MPU), or the like) of the system or apparatus reads out program codes and executes processings corresponding thereto. In this case, the program and the storage medium in which the program has been stored construct the invention.

While present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-057903, filed Mar. 15, 2010, which is hereby incorporated by reference herein in its entirety.

What is claimed is:

1. An image pickup apparatus comprising:
an image pickup unit;
a display unit configured to display a live image picked up by the image pickup unit;
a photographic preparation unit configured to adjust a photographic setting;
a photographic processing unit configured to effect the photography by the image pickup unit on the basis of the photographic setting adjusted by the photographic preparation unit and execute a recording processing for recording a photographed image in a recording medium;
a detection processing unit configured to detect a touch operation applied to the display unit and a touch position of the touch operation;
a control unit configured to effect control to cause the photographic preparation unit to execute a photographic preparation processing to adjust the photographic setting in response to a touch to the display unit being detected and cause the photographic processing unit to execute the recording processing in response to the detection unit detecting that the display unit loses the touch,
wherein the control unit controls to cause the photographic preparation unit to cancel the photographic preparation processing in a case where after a touch for causing the photographic preparation unit to execute the photographic preparation processing is detected, a position of the touch moves to an edge position of the display unit without losing the touch.

2. An apparatus according to claim 1, further comprising a notification unit configured to notify that the photographic preparation processing is completed, in accordance with the photographic preparation unit completing the photographic preparation processing.

3. An apparatus according to claim 2, wherein the notification unit effects the notification by generating a sound indicating the completion of the photographic preparation processing.

4. An apparatus according to claim 3, wherein the notification unit effects the notification by generating an in-focus sound indicating the completion of the photographic preparation processing.

5. An apparatus according to claim 2, wherein the notification unit effects the notification by displaying an in-focus frame indicating the completion of the photographic preparation processing on the display unit.

6. An apparatus according to claim 1, wherein the photographic preparation unit adjusts the photographic setting on the basis of the touch position detected by the touch detection unit.

7. An apparatus according to claim 1, wherein the photographic preparation processing includes adjustment of at least one of a focus, an exposure, and a white balance.

8. An apparatus according to claim 1, wherein the display unit is a touch panel which is arranged to display an image.

9. An image pickup apparatus comprising:
an image pickup unit;
a display unit configured to display a live image picked up by the image pickup unit;
a photographic preparation unit configured to execute a photographic preparation processing for adjusting a photographic setting;
a photographic processing unit configured to effect the photography by the image pickup unit on the basis of the photographic setting adjusted by the photographic preparation unit and execute a recording processing for recording a photographed image in a recording medium;
a detection processing unit configured to detect a touch operation applied to the display unit and a touch position of the touch operation;
a control unit configured to effect control to cause the photographic preparation unit to execute the photographic preparation processing in response to a touch to the display unit being detected and cause the photographic processing unit to execute the recording processing in response to the detection unit detecting that the display unit loses the touch,
wherein in a case where after a touch for causing the photographic preparation unit to execute the photographic preparation processing is detected, a position of the touch moves to an edge position of the display unit without losing the touch, the control unit controls to cause the photographic processing unit not to execute the recording processing even if the display unit loses the touch.

10. An apparatus according to claim 9, wherein the photographic preparation unit adjusts the photographic setting on the basis of the touch position detected by the touch detection unit.

11. An apparatus according to claim 9, wherein the photographic preparation processing includes adjustment of at least one of a focus, an exposure, and a white balance.

12. An apparatus according to claim 9, wherein the display unit is a touch panel which is arranged to display an image.

13. A control method for an image pickup apparatus having an image pickup unit, a display unit configured to display a live image picked up by the image pickup unit, a photographic preparation unit configured to adjust a photographic setting, and a photographic processing unit configured to effect the photography by the image pickup unit on the basis of the photographic setting adjusted by the photographic preparation unit and execute a recording processing for recording a photographed image in a recording medium, comprising:
detecting a touch operation applied to the display unit and a touch position of the touch operation; and
causing the photographic preparation unit to execute a photographic preparation processing to adjust the photographic setting in response to a touch to the display unit being detected;
causing the photographic processing unit to execute the recording processing in response to the detection step detecting that the display unit loses the touch; and
causing the photographic preparation unit to cancel the photographic preparation processing in a case where after a touch for causing the photographic preparation unit to execute the photographic preparation processing is detected, a position of the touch moves to an edge position of the display unit without losing the touch.

14. A control method for an image pickup apparatus having an image pickup unit, a display unit configured to display a live image picked up by the image pickup unit, a photographic preparation unit configured to execute a photographic preparation processing for adjusting a photographic setting, and a photographic processing unit configured to effect the photography by the image pickup unit on the basis of the photographic setting adjusted by the photographic preparation unit and execute a recording processing for recording a photographed image in a recording medium, comprising:
detecting a touch operation applied to the display unit and a touch position of the touch operation;
causing the photographic preparation unit to execute the photographic preparation processing in response to a touch to the display unit being detected;
causing the photographic processing unit to execute the recording processing in response to the detection unit detecting that the display unit loses the touch;
even if the display unit loses the touch in a case where after a touch for causing the photographic preparation unit to execute the photographic preparation processing is detected, a position of the touch moves to an edge position of the display unit without losing the touch, causing the photographic processing unit not to execute the recording processing even if the display unit loses the touch.

15. A non-transitory computer readable recording medium storing a program comprising a program code for causing a computer to execute the control method according to claim 13.

16. A non-transitory computer readable recording medium storing a program comprising a program code for causing a computer to execute the control method according to claim 14.

* * * * *